United States Patent [19]

Chamoulaud

[11] 4,232,481
[45] Nov. 11, 1980

[54] CARPET OF VEGETABLE MATTER

[76] Inventor: Michel C. Chamoulaud, Pont de l'Eyre, 33770 Salles, France

[21] Appl. No.: 62,378

[22] Filed: Jul. 31, 1979

Related U.S. Application Data

[63] Continuation of Ser. No. 856,569, Dec. 2, 1977, abandoned.

[30] Foreign Application Priority Data

Dec. 3, 1976 [FR] France .................. 76 36574

[51] Int. Cl.³ .................................. A01C 1/04
[52] U.S. Cl. ............................. 47/56; 111/1
[58] Field of Search .................. 71/23–24; 47/56, 9, 58; 111/1

[56] References Cited

U.S. PATENT DOCUMENTS

| | | | |
|---|---|---|---|
| 1,978,102 | 10/1934 | Clapp | 47/56 UX |
| 3,863,388 | 2/1975 | Loads | 47/56 |
| 3,890,739 | 6/1975 | Blackburn | 47/56 |
| 3,903,816 | 9/1975 | Brem | 111/1 |
| 3,940,257 | 2/1976 | Sherwin et al. | 71/23 |
| 4,063,384 | 12/1977 | Warren et al. | 47/56 UX |
| 4,063,385 | 12/1977 | Friedberg | 47/56 X |
| 4,067,716 | 1/1978 | Sterrett | 71/24 |
| 4,154,174 | 5/1979 | Rees et al. | 111/1 |

FOREIGN PATENT DOCUMENTS

| | | | |
|---|---|---|---|
| 1126663 | 3/1962 | Fed. Rep. of Germany | 47/56 |
| 1290338 | 9/1972 | United Kingdom | 47/56 |

OTHER PUBLICATIONS

Modern Potting Composts, Bunt, 1976, Penn State Univ. Press, pp. 30–34.

*Primary Examiner*—Robert E. Bagwill

[57] ABSTRACT

In the production of a carpet of grass or other vegetable matter, a compost made from wood bark which is crushed and gauged, is spread onto a substantially flat surface impermeable to plant roots, the compost being mixed with seed before, during, or after, application of the flat surface. The roots of the plants formed from the seed form a fabric embedded in the compost. The carpet thus formed may be easily detached from the flat surface.

15 Claims, 5 Drawing Figures

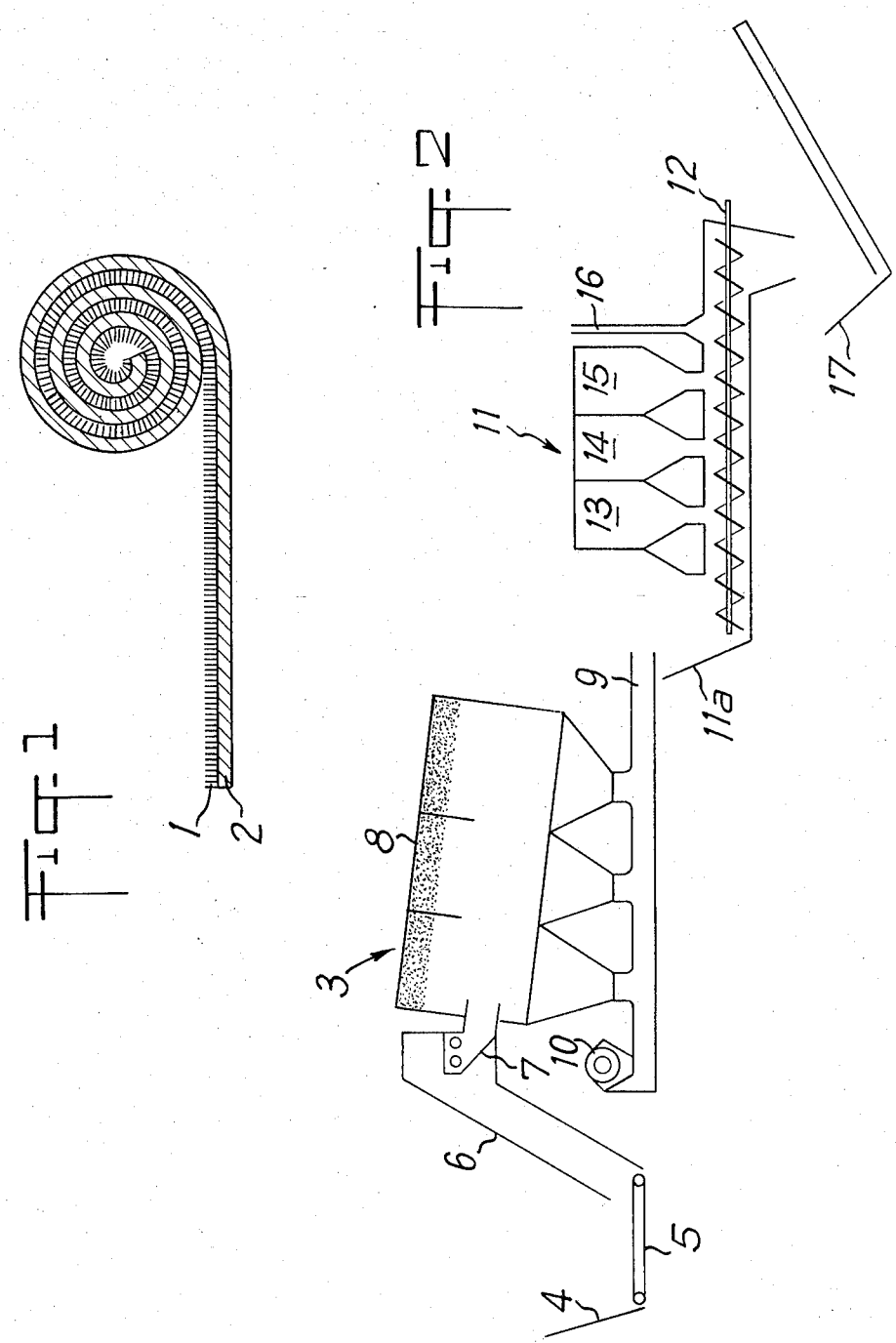

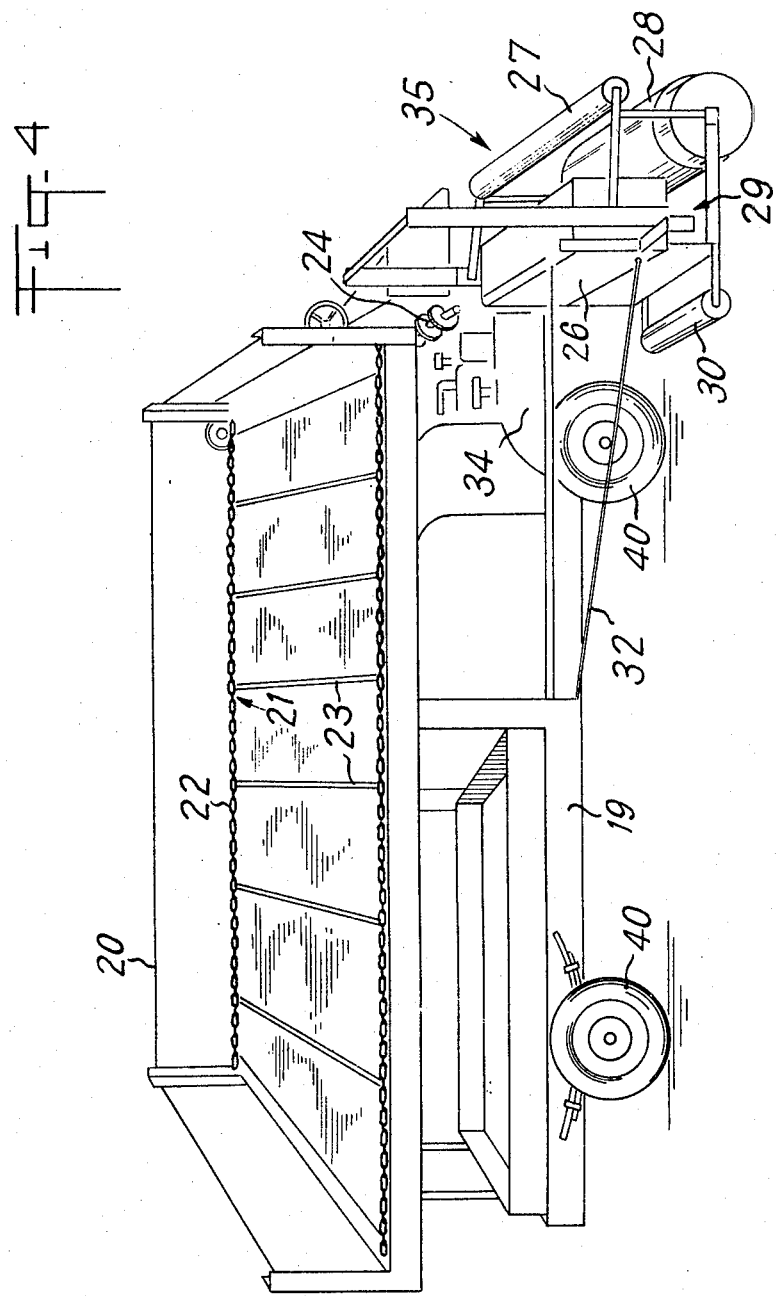

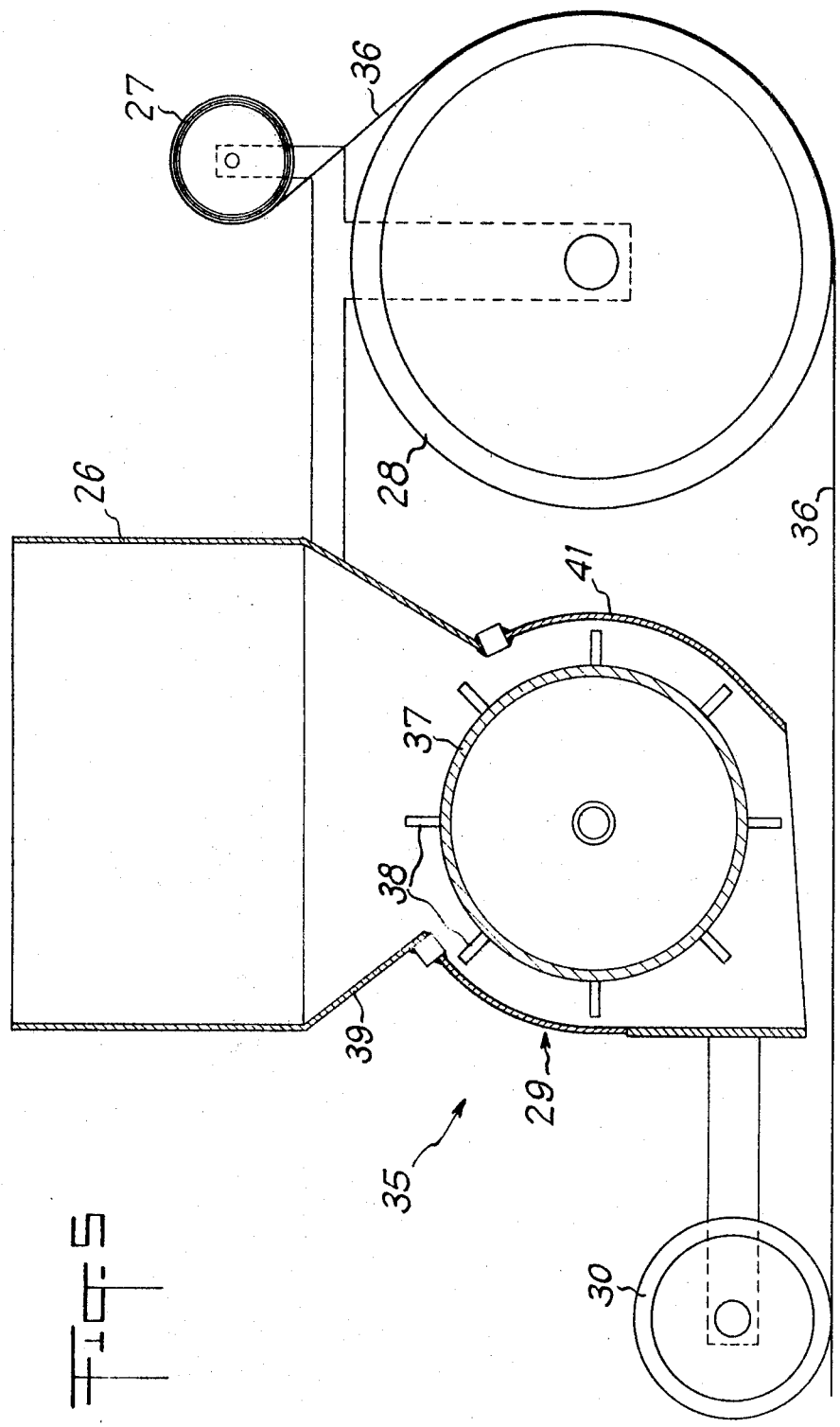

CARPET OF VEGETABLE MATTER

This is a continuation of application Ser. No. 856,569 filed Dec. 2, 1977 (now abandoned).

BACKGROUND OF THE INVENTION

1. Field of the Invention

The present invention relates to carpets of vegetable matter, for example carpets of lawn grass.

2. Description of the Prior Art

There has been proposed in French Pat. No. 2,208,598, a process for the production of a grass carpet in which a cloth is disposed on one side of a strip of material containing humus and grass seeds, and the grass is allowed to grow in such a manner that the humus and the grass that has taken root in it adhere to the cloth. According to this grass cultivation process which is intended to be carried out principally directly onto the soil, the grass roots penetrate through the cloth into the soil and cause the adherence to the cloth of a mixture of vegetable mould, clay and fertilizer on which the grass develops. Thus the cloth acts as a support for the grass carpet when the latter is detached from its place of production to be carried, then laid, on the ground to be grassed.

Such a process has, however, disadvantages, due to the fact that it requires the incorporation of a cloth in each carpet of grass formed and that the resulting grass carpets are relatively heavy and difficult to handle, account being taken of the far from negligible weight of the layer of humus on which the grass developed. Moreover, with such a process it is impossible, when it is required that the grass carpet should be transportable, that is to say it should be of relatively small thickness, not to cut and leave in the ground a substantial portion of the end of the grass roots. As a consequence, the grass carpet is thus formed of grass cuttings which are relatively weak.

The present invention has for its object to obviate the above-mentioned drawbacks and to provide a vegetable carpet that is at the same time light, well aerated and easy to handle and transport, while permitting ease of removal from the cultivation zone and ease of laying.

The invention has furthermore for its object a vegetable carpet, particularly a grass carpet, whose production can be carried out on an industrial scale in an easy and particularly speedy manner, having improved survival characteristics.

SUMMARY OF THE INVENTION

According to the present invention, there is provided a carpet of vegetable matter, said carpet comprising a thin layer of compost composed of crushed bark, and vegetable matter having whole roots embedded into the compost to form a supporting fabric.

The crushed bark is preferably conifer bark and the seeds are preferably grass seeds so as to form a grass carpet.

Thus, no additional artificial supporting fabric is required, as it is the actual grass roots which, rooted in the crushed conifer bark, form a natural fabric which ensures the holding of the grass carpet. Moreover, the operator is assured of being able easily to keep the formed grass carpet, as the grass roots rooted in the crushed conifer bark remain complete and are not cut. In particular, the grass carpet, due to the fact that it comprises entire plants, may be subjected to cold preservation processes while retaining all its qualities.

Moreover, the presence of a compost based on conifer bark has many advantages. In particular, the grass carpet thus formed is light in weight and well aerated, in such a manner that more economical transport costs can be obtained.

In addition, when the grass carpet is disposed on the area to be grassed, the compost based on conifer bark effects a mulching of the soil and restricts the evaporation of water. On the ground, the compost decomposes very slowly to convert practically wholly into humus, in such a manner that it helps the enrichment of the soil.

The wood bark forms a natural wood cellulose substrate of low density which at the same time ensures a satisfactory aeration of the carpet and restricts water evaporation. Bark, particularly conifer bark, through the nutrients, including oligo-elements, that it contains, contributes to the growth of grass both during the production of the carpet and after the laying of the carpet on the ground.

The grass carpet preferably comprises conifer bark, finely crushed and gauged, whose diameter is below about 10 mm. The crushing and the gauging of the bark permits ease and speed in the production of the grass carpet.

The grass carpet may be cut into strips or rolled up for handling.

Further according to the invention, there is provided a process for producing a carpet of vegetable matter, said process comprising forming a compost made from bark which is crushed and gauged, providing a substantially flat surface impermeable to plant roots, forming a thin layer of the compost mixed with seed on said surface, permitting growth of plants from the seeds in such a manner that the roots of the plants form a fabric embedded in the compost, and detaching the carpet thus formed from the said surface.

The flat surface may be constituted by a film of plastics material which may be finely perforated, and placed on previously levelled ground. The plastics film may be permeable to water or non-permeable to water. In the latter case provision may be made for the addition to the compost of a binder or a stabilising product which, in the event of heavy rainfall, for example, prevents a dispersion or a loss of grass seed, or of compost elements.

The film of plastics material used is preferably opaque so as to cause a concentration of heat at the level of the grass roots.

Preferably, on the previously levelled ground, a depression is formed to outline the strip of grass to be produced and then, in the outlined depression, there is deposited the film of plastics material, the width of which is slightly greater than that of the strip of grass to be produced, whereby the film covers the bottom and the sides of the depression.

In an alternative arrangement, the flat surface may be made from a solid material such as wood or concrete.

Preferably, the compost is mixed with fertilizers and with the grass seed before spreading the mixture onto the flat surface.

It is advantageous to allow pre-germination of the grass seed in the compost before the latter is spread.

In an alternative form of the process, fertilizers and grass seed are mixed with the compost during or after the spreading of the compost on the flat surface non-permeable to roots.

Still further according to the invention, there is provided apparatus for producing a carpet of vegetable matter, said apparatus comprising a machine for spreading a mixture of compost and seed onto a surface impermeable to plant roots, said machine comprising a vehicle chassis and, mounted on the chassis, a storage container for the mixture to be spread, a dispensing container, means for conveying the mixture between the storage container and the dispensing container, means for effecting even and metered dispensing of the mixture contained in the dispensing container, a liftable roller disposed at the front of the machine, said roller being rotatable when it is applied on the ground to form in same a depression of predetermined width and depth, and storage and dispensing means for storing and dispensing material non-permeable to roots to be laid in the depression, the storage and dispensing means being disposed in front of the dispensing container.

Preferably, an application unit constituted by the dispensing container, the depression-forming roller and the means for storing and dispensing the material may be slightly staggered, in the working position, to one side of the axis of the machine.

Preferably, the dispensing means for the said material and the means for effecting an even and metered dispensing of the mixture product contained in the dispensing container are synchronously driven from the motion of the depression-forming roller, and the conveying means for conveying the mixture between the storage container and the dispensing container are driven from the engine which propels the machine in such a way as to be also synchronized with the forward speed of the machine.

BRIEF DESCRIPTION OF THE DRAWINGS

The invention will now be further described, by way of example only, with reference to the accompanying diagrammatic drawings: in which:

FIG. 1 is an elevation of a grass carpet according to the invention, the carpet being shown partly wound into a roll;

FIG. 2 shows schematically a device for preparing the basic mixture for the formation of the carpet;

FIG. 4 is a side elevation of the machine of FIG. 3; and

FIG. 5 is an enlarged section, taken on line V—V of FIG. 3.

DESCRIPTION OF THE PREFERRED EMBODIMENTS

Figure 3:
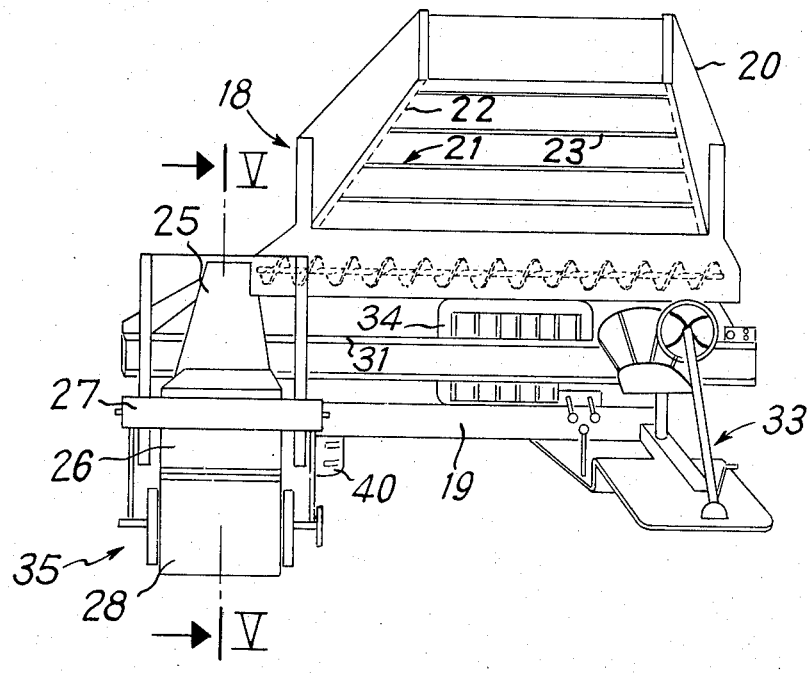
FIG. 3 is a front elevation of a machine for spreading the mixture.

There is seen in FIG. 1 a grass carpet which comprises under a grass layer 1 a support 2 composed of crushed and gauged conifer bark, into which the roots of the grass 1 are inserted, which roots form a natural fabric in the support 2.

Such a grass carpet may be made in simple manner by means of the process to be described and which may be mechanised.

To manufacture the carpet, a compost is first made from finely crushed and gauged conifer bark. The maximum diameter of the crushed bark is preferably less than 10 mm, but the production of dust must be avoided.

Advantageously, fertilizer is mixed with the crushed bark, and this contributes to the enrichment of the compost. For example, an advantageous fertilizer composition comprises lime (about 3 kilos per cubic meter), magnesium sulphate (approx. 500 g/m$^3$) and compound fertilizer (3 kg/per cubic meter), the latter introducing 450 g per m$^3$ of nitrogen, phosphoric acid and potash pure element.

Other fertilizer compositions are naturally possible, according to the applications envisaged. It is also quite possible to use delayed-action fertilizers whose active elements are released only progressively with some delay relative to the moment of use of the fertilizer. Thus, it is possible to avoid adding fertilizer subsequently at the actual place of cultivation, or at the time when the grass carpet is laid at its place of use. Also, compensation may be made for those losses of nitrogen which may take place in the event of the grass carpet being formed on a surface, for example a film of plastics material which has perforations through which the water may escape and take along nutrients contained in the compost mixture. In each case the compost made of bark should not contain additional organic elements such as crushed town refuse which would lead to the formation of a compact, inadequately aerated mass. The grass seed is mixed with the compost in a density appropriate to the variety of the seed and the thickness of the desired carpet. For example, 1.5 kg of standard grass seed is used per cubic meter to obtain a carpet of 2 cm thickness.

The production of the grass carpet may be carried out for example in a field, preferably in light soil.

The field is prepared for example by means of a cutting tool or any other tool permitting a well crumbled soil structure to be obtained, and coarse elements, such as stones, are removed. The ideal cultivation condition is on well drained, flat, perfectly levelled and easily watered soil surfaces. The agronomic value of the soil is of no importance. It is advantageous to spread a total herbicide before starting cultivation.

When the cultivation soil has been sufficiently levelled, strip-like depressions having the approximate width and depth of the required carpet are formed by means of a roller. A plastics film, preferably opaque, is unwound and laid in the depression, and may be finely perforated on the bottom and the sides of the depression so as to permit the flowing away of the water while preventing the penetration of the roots.

A fine layer of previously prepared compost is spread evenly in the depression.

It is desirable, but not essential, to allow the seed to pre-germinate in the compost some time before spreading. The growth of the grass is then faster, and crop rotation may be speeded up.

The wood bark which is crushed and advantageously gauged, plays an important part in the production of the grass carpet, since, crushed and gauged bark may be easily premixed with fertilizer and seed, in such a manner that the development of the grass carpet takes place more quickly. It is then possible to allow the grass seed to pre-germinate in the compost-fertilizer-seed mixture before spreading. But even without pre-germination, the sprouting of the grass takes place more quickly than in a standard cultivation process, as the mixture of the seed with the substrate and the fertilizer which has already been made before the layer of product is spread on the ground, ensures an immediate proximity of the seed and the nutrient medium, and the bark has the property of good moisture retention.

In addition, to their nutrient qualities, the crushed bark particles, which are gauged so as to be fine without creating dust (normally, a particle is considered to be dust when its diameter is below about 1 mm), permit spreading a layer of product of small and even thickness. Bark, through the fibres it contains, ensures the retention of the grass seed during the formation of the carpet. It has furthermore been found that through their dark colour, added to the fact that the layers of compost are fine, the bark particles ensure a concentration of heat on the grass seed, which further increases the rate of growth of the grass.

Once spread on the substantially flat surface constituted by the plastics film, the mixture of seed and compost must be frequently watered so as to remain constantly moist. So as to obtain a good fertilisation the addition may be made, for example with the watering water, of a general fertiliser with a high nitrogen content.

At the end of about 4 to 6 weeks the grass has to be cut with a lawn mower which preferably goes over the side of the strip.

One or two weeks later, the strips of grass may then be lifted up, possibly after a further mowing. The roots, taken up into the compost, themselves form a fabric which is sufficiently strong to permit ease of handling the grass carpet, either as a roll, or as a strip, without the need to provide an additional support fabric. The plastics film remains in the depression after the removal of the grass carpet, so that it is possible immediately to spread a new layer of compost to prepare a new carpet. Several crop rotations may very easily be performed in the same year.

The grass strips grown on the plastics sheet need not be taken up as soon as the grass carpet is sufficiently strong, i.e. about 5 to 7 weeks after sowing, but may be still maintained according to the same process consisting of watering, fertilising and mowing regularly. It is then possible to maintain the strip of grass at its place of cultivation for over a year to increase the strength of the carpet.

After having been taken up, the strips or rolls of grass are carried to their place of use and are placed on the ground to be covered and which has been prepared beforehand in a standard manner, and watered before laying.

As soon as it has been laid, the grass carpet has a fine appearance, and the presence in the carpet of a layer of conifer-bark-based compost layer ensures a mulching of the ground which prevents too great a water evaporation. As it decomposes, a process which lasts several years, the compost is converted into humus and contributes towards an enrichment of the soil.

It should be noted that the grass carpet obtained by means of the above-described cultivation process is light, as a consequence of the fact that conifer compost is of low density (450 kg per cubic meter on an average). Thus, for standard lawn grass, the average weight of the carpet obtained is about 10 kg per m$^2$. This low weight, added to the fact that the support of the carpet on a basis of conifer bark, being well aerated, helps towards reducing the cost of transport. In particular, provision may be made for using slower and more economical means of transport, as the satisfactory preservation of the grass carpets is improved.

For forwarding to very distant areas, the preservation of the carpets may be improved further if the latter are stored in refrigerated areas in plastics film, to prevent dehydration.

As a result of the fact that the grass carpets are made up of whole plants, and not of cuttings, they withstand very satisfactorily a cold treatment and may thus be kept for several months. It is in particular possible to store the grass carpets at a temperature in the range $-2°$ to $+4°$ C. (and preferably near to $0°$ C.) in a medium having a high moisture content in excess of about 60%, and preferably in excess of 80%.

The storage life is increased with increasing moisture content and to permit storage over a period of several months it is desirable that the moisture content should be of the order of 95% or greater.

The grass carpet cultivation process described above permits a very high rate of mechanization which reduces costs considerably.

Apparatus for carrying out the process described is shown in FIGS. 2 to 5.

There is shown in FIG. 2 in diagrammatic representation a device for the preparation of a mixture of compost and seed intended to be spread on the cultivation surface, whereas FIGS. 3 to 5 represent diagrammatically a machine for spreading the mixture from which the grass carpet is to be formed.

The device shown in FIG. 2 comprises a crushing and gauging unit 3 and is supplied from a hopper 4 charged with the coarse material. The hopper 4 which is a mobile bottom hopper feeds the coarse material via a conveyor belt 5 and a duct 6 which ensures even metering to a crusher 7 which is adjusted in such a manner that it does not crush too finely, so as to avoid creating dust. However, the maximum section of the crushed bark must be approximately 100 sq.mm.

The outlet of the crusher 7 communicates with sorting means 8 which may be a drum. A driving motor is represented at 10. Any insufficiently crushed bark is sent back to the input of the crusher 7, while the gauged bark crushed in sufficiently fine manner is discharged through a duct 9 to a feed hopper 11a which supplies a mixer 11 which operates advantageously in a continuous manner. The crushed material is moved forward at a constant rate by a conveyor screw 12 of the mixer 11 and is mixed with lime at a station 13, then with fertiliser at a station 14, and finally with seed at a station 15. A moistening station 16 may be provided at the outlet of the mixer 11, in order to promote pre-germination. On coming out of the mixer 11, the mixture is collected in a hopper 17.

The prepared mixture may be stored for several days before use, then it is introduced into a spreading machine, for example with the aid of known apparatus for dispensing silage.

A suitable form of spreading machine 18 is shown in FIGS. 3 to 5 and comprises a vehicle chassis 19 on which is mounted a container 20 for storing the mixture. A scraper belt 21, comprising two traction chains and scrapers 23, is disposed in the bottom of the container 20 to feed the mixture to a conveying screw 23. The latter dispenses the product in a gully 25 over a dispensing container 26.

A roll 27 for storing a film of plastics material 36, whose width is preferably slightly greater than that of the grass strips which have to be formed, is placed at the front of the machine 18 and above a roller 28 which bears on the ground to form a depression defining the strip of grass to be produced, and to ensure the correct positioning of the strip of plastics material 36 which is unwound from the roll 27. The mixture disposed in the dispensing container 26 is spread on the plastics film 36 which the roller 28 has applied to the ground (see FIG. 5). The dispensing container 26 is adapted, at its bottom part 29, to effect an even and metered distribution of the mixture throughout the width of the plastics film deposited on the ground. An applicator roller 30, disposed rearwards of the dispensing container 26 and independent of the traction wheels of the vehicle, bears on the ground and serves to compact slightly the layer of mixture deposited on the plastics film.

The bottom part 29 of the dispensing container 26 comprises an outer casing inside which a cylindrical drum 37 is disposed, whose length is about the same as that of the roller 28, and which is provided on its periphery with blades 38. The blades 38 ensure an even and metered dispensing of the product contained in the dispensing container 26 and which falls onto the drum 37 through a hopper-shaped intermediate protion 39. The side casing conforms substantially to the shape of the bladed drum 37 in such a manner that a slight gap is provided between the casing and the edges of the blades 38. The drive of the drum 37 is obtained from that of the roller 28, for example by means of a chain transmission (not shown). Generally, all of the mobile parts such as the scraper belt 21, the screw 24, the dispensing drum 37, and the roller 28, are driven synchronously with the forward movement of the machine 18, in particular from the engine 34 which effects at the same time the drive of the machine 18, whose four wheels 40 are preferably driving wheels, and the drive of the various mechanical components participating in the spreading of the mixture or the dispensing of the plastics film.

Alternatively, the roll 27 and the drum 37 both of which form part of a retractable assembly 35, may be synchronously driven from the movement of the roller 28 which, when it lies on the ground, is driven by forward movement of the machine while the means 22, 23, 24 for conveying the mixture between the storage container 20 and the dispensing container 26, are driven directly from the engine which drives the vehicle, in such a manner as to be also synchronised with the speed of movement of the vehicle.

In the working position, the assembly 35 constituted by the dispensing container 26, the roll 27, and the rollers 28 and 30 is slightly offset to one side of the machine.

A horizontal transverse slide rail 31 is disposed at the front end of the machine 18 and mounts the assembly 35 to enable the assembly 35 to be retracted laterally towards the centre of the machine, while lifting the assembly 35 fitted with a brace in order to facilitate manoeuvring of the machine or driving on the road.

The driving/operating station 33 is provided at the front of the machine on the side opposite the assembly 35 so as to ensure good visibility of the dispensing means while permitting the intended track of the roller 28 to be checked.

When the mixture has been laid in strips, the only operations to be performed are watering, fertilization when appropriate with additional fertilisers, and mowing. Watering must cease a little before the grass carpet is picked up to prevent it being soaked with water during the transfer operations. The carpet does not adhere to the substantially flat plastics film on which it is formed, and may be separated from the plastics film without effort. It is also possible to detach from the ground the assembly constituted by the grass carpet and the plastics film which then forms a packing which is removed only when the grass carpet has been transported to the location at which it is to be laid.

What is claimed is:

1. A transportable carpet sheet of grass, said carpet sheet comprising a thin layer of compost consisting essentially of finely crushed and gauged conifer bark the particles of which have a section of not more than 100 sq mm and a diameter of at least 1 mm, and grass having whole roots embedded into the compost to form a supporting fabric therein for the sheet, the sheet thickness being approximately 2 cm.

2. A carpet according to claim 1, wherein the carpet is in the form of a strip.

3. A carpet according to claim 1, wherein the carpet is wound into a roll.

4. A process for producing a transportable carpet sheet of grass, said process comprising forming a compost consisting essentially of conifer bark which is finely crushed and gauged, and is composed of particles having a section of not more than 100 sq mm and a diameter of at least 1 mm; mixing the compost with grass seed; providing a substantially flat surface impermeable to plant roots; mechanically metering and spreading a thin layer of the compost mixed with seed on said surface; permitting growth of grass from the seed by watering, fertilizing and mowing until the roots of the grass form a fabric embedded in the compost; and detaching the carpet thus formed from the said surface.

5. A process according to claim 4, comprising fertilizing the compost by introducing lime, nitrogen, phosphoric acid and potash therein.

6. A process according to claim 4, wherein the said substantially flat surface is constituted by a finely perforated plastics film, laid on a previously-levelled ground.

7. A process according to claim 6, wherein the plastics film is opaque.

8. A process according to claim 4, comprising forming in the previously-levelled ground a shallow depression of strip-like form having a substantially flat bottom surface, and laying the plastics film in said depression, the width of the film being slightly greater than the width of the depression whereby the film covers the bottom surface and the sides of the depression.

9. A process according to claim 4, wherein the seed is allowed to pre-germinate in the compost before the latter is spread onto said surface.

10. A process according to claim 4, comprising adding a binder to the compost and seed mixture.

11. A process according to claim 4, comprising adding to the compost and seed mixture delayed-action fertilisers which release the active substances progressively over a period of time.

12. A process according to claim 4, comprising storing the grass carpet in a watertight plastics packing at a temperature from about $-2°$ C. to $+4°$ C.

13. A process according to claim 4, comprising storing the carpet in an enclosed environment having a moisture content greater than about 80% and a temperature from about $-2°$ C. to $+4°$ C.

14. A process according to claim 4, wherein the seed is mixed with the compost prior to application to the said surface.

15. A process according to claim 4, wherein the seed is mixed with the compost after application of the compost to the said surface.

* * * * *